(12) United States Patent
Chan et al.

(10) Patent No.: US 8,596,886 B2
(45) Date of Patent: Dec. 3, 2013

(54) HERMETIC SMALL FORM FACTOR OPTICAL DEVICE PACKAGING FOR PLASTIC OPTICAL FIBER NETWORKS

(75) Inventors: Eric Yuen-Jun Chan, Mercer Island, WA (US); Dennis G. Koshinz, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 74 days.

(21) Appl. No.: 13/227,428

(22) Filed: Sep. 7, 2011

(65) Prior Publication Data

US 2013/0058617 A1    Mar. 7, 2013

(51) Int. Cl.
   *G02B 6/36* (2006.01)
(52) U.S. Cl.
   USPC .............................. 385/92; 385/138; 385/88
(58) Field of Classification Search
   USPC ................................................. 385/88–94
   See application file for complete search history.

(56) References Cited

U.S. PATENT DOCUMENTS

| | | | |
|---|---|---|---|
| 4,307,934 A | 12/1981 | Palmer | |
| 5,202,943 A | 4/1993 | Carden et al. | |
| 5,212,762 A * | 5/1993 | Shimada et al. | 385/145 |
| 5,745,624 A | 4/1998 | Chan et al. | |
| 6,056,447 A * | 5/2000 | Caras | 385/92 |
| 6,757,308 B1 | 6/2004 | Eldring et al. | |
| 6,853,787 B2 | 2/2005 | Andrieu et al. | |
| 6,900,509 B2 | 5/2005 | Gallup et al. | |
| 6,960,032 B2 | 11/2005 | Eldring et al. | |
| 7,254,301 B2 * | 8/2007 | Hoshino et al. | 385/52 |
| 7,303,340 B2 | 12/2007 | Hubner | |
| 7,309,174 B2 | 12/2007 | Farr | |
| 7,841,781 B2 | 11/2010 | Wang | |
| 2002/0057883 A1 | 5/2002 | Malone et al. | |
| 2003/0053169 A1 | 3/2003 | Nasu et al. | |
| 2004/0114884 A1 | 6/2004 | Shinde et al. | |
| 2004/0240804 A1 | 12/2004 | Mahapatra et al. | |
| 2006/0018609 A1 * | 1/2006 | Sonoda et al. | 385/93 |
| 2008/0223427 A1 | 9/2008 | Ohno | |
| 2010/0232751 A1 | 9/2010 | Biwa et al. | |
| 2011/0305415 A1 * | 12/2011 | Kawai | 385/14 |

FOREIGN PATENT DOCUMENTS

EP    0 872 748 A2    10/1998

OTHER PUBLICATIONS 3.0 mm Based Construction Step-Index 200, 400, 1000 μm HCS® General Purpose Cables, OFS, Specialty Photonics Division, retrieved from http://www.specialtyphotonics.com, Aug. 31, 2011 (1 pg).
Chan et al., Challenges for Developing Low-Cost Avionics/Aerospace-grade Optoelectronic Modules, Electronic Components and Technology Conference, 1996 IEEE (8 pgs).
Small Form Factor Transceiver Multisource Agreement, Cooperation Agreement for Small Form Factor Transceivers, Jan. 6, 1998 (8 pgs).
U.S. Appl. No. 12/464,585, Method and Apparatus for Making Connections Between Optical Fibers and Optical Components, filed May 12, 2009 (25 pgs).
International Search Report and Written Opinion; International Application No. PCT/US2012/049634; European Patent Office; Nov. 15, 2012.

* cited by examiner

*Primary Examiner* — Ellen Kim
(74) *Attorney, Agent, or Firm* — Toler Law Group, PC (57) ABSTRACT

An apparatus includes an enclosure configured to contain at least one optoelectronic device and to interface the at least one optoelectronic device to a polymer-clad silica (PCS) optical fiber. The enclosure includes a first section that includes a base portion and a wall portion. The wall portion is coupled to the base portion. The wall portion defines an open-ended slot that is configured to receive a first portion of a PCS optical fiber lead extending through the wall portion. A second section is configured to sealingly engage a first edge of the wall portion and the first portion of the PCS optical fiber lead. Passive alignment of PCS optical fiber leads to optoelectronic devices inside the package is accomplished using special designed precision mold ceramic block with integral U-grooves.

24 Claims, 11 Drawing Sheets

HERMETIC SMALL FORM FACTOR OPTICAL DEVICE PACKAGING FOR PLASTIC OPTICAL FIBER NETWORKS

FIELD OF THE DISCLOSURE

The present disclosure is generally related to hermetically-sealed optical components for plastic optical fiber networks used in harsh aerospace environment.

BACKGROUND

Optical networking using plastic optical fibers (POF) may provide advantages over networking using copper or other metal wiring. Plastic optical fiber networking may have lower installation and maintenance costs. Moreover, because plastic optical fibers are lighter than metal wires that would be needed to carry an equivalent amount of data, using plastic optical fibers may result in appreciable weight savings. The weight savings may be significant for networks aboard vehicles, such as aircraft, where the weight savings may result in reduced fuel consumption and lower emissions.

To make use of plastic optical fiber networks in environments that may not be strictly controlled, optical devices, such as transmitters, receivers, and transceivers may be hermetically sealed. In the case of an aircraft, for example, optical devices may be deployed in locations on the exterior of the aircraft, such as near engines or near the landing gear, that may not be pressurized or insulated against the ambient environment. If the optical devices in such locations are not hermetically sealed, condensation, particulates, and other undesired material may form on the optical devices or on exposed ends of the plastic optical fibers. Conventional methods of hermetic sealing optical devices may involve many precise manufacturing steps that are expensive. In addition, certain steps of conventional methods may use processing temperatures that can damage plastic optical fiber.

SUMMARY

Disclosed embodiments enable formation of hermetically sealed optical devices for plastic optical fiber networks. For example, an optical device (including one or more optoelectronic devices within an enclosure) may be hermetically sealed to one or more optical fiber leads to form a hermetically sealed optical component that can be coupled to end-faces of plastic optical fibers with low insertion loss. For example, the optical fiber leads may include a portion or length of a polymer-clad silica fiber, such as HCS® fiber, which is a registered trademark of FURUKAWA ELECTRIC NORTH AMERICA, INC. Hermetically sealing the optical device to the one or more optical fiber leads enables use of the hermetically sealed optical component in potentially harsh environments. Production of the hermetically sealed optical components involves relatively few steps, thus, enabling the hermetically sealed optical components to be produced at relatively low cost.

A particular enclosure for a hermetically sealed optical component may include a first section that includes a base portion and wall portions to receive an optoelectronic device. The first section includes an open-ended slot in one of the wall portions through which a polymer-clad silica (PCS) optical fiber lead may be received. The PCS optical fiber lead may be guided in place adjacent the optoelectronic device housed in the first section by an alignment body. The PCS optical fiber lead may have a metallized section at a point where the PCS optical fiber lead is received into the open-ended slot in the wall portion of the first section. The PCS optical fiber lead may be aligned to the optoelectronic device and may be mechanically coupled to the first section, such as by epoxy, to secure the PCS optical fiber lead to the first section outside the wall portion of the first section.

After the PCS optical fiber lead is in place, a second section of the enclosure is installed over the first section. The second section may be shaped to engage edges of the wall portion of the first section. The second section may include or be coupled to a layer of solder to join the second section to the edges of the wall section and to the metallized portion of the PCS optical fiber lead. Heat may be applied to the second section adjacent to locations where the second section meets the edges of the first section to melt the solder. Thus, the second section may be joined to the first section and the PCS optical fiber lead may be soldered in place and sealed to the first section and to the second section of the enclosure. The enclosure housing the optoelectronic device and the PCS optical fiber leads together from an optical component that can be coupled to a plastic optical fiber with low insertion loss.

In a particular embodiment, an apparatus includes an enclosure configured to contain at least one optoelectronic device and to interface the at least one optoelectronic device to a PCS optical fiber lead. The enclosure includes a first section that includes a base portion and a wall portion. The wall portion is coupled to a perimeter about the base portion. The wall portion defines an open-ended slot in a first edge, which includes an open end that is configured to receive a first portion of the PCS optical fiber lead extending through the wall portion. A second section is configured to sealingly engage the first edge of the wall portion and the first portion of the PCS optical fiber lead at the open end of the open-ended slot.

In another particular embodiment, a method includes, at a first section of an enclosure having a base portion and a wall portion coupled to a perimeter of the base portion, receiving a first portion of a PCS optical fiber lead at an open end of an open-ended slot in a first edge of the wall portion. The first portion of the PCS optical fiber lead is received such that an end of the PCS optical fiber lead is aligned with an optical surface of an optoelectronic device and the first portion of the PCS optical fiber lead extends through the wall portion. The PCS optical fiber lead is physically secured to the first portion of the enclosure outside the wall portion. The enclosure is hermetically sealed by fixably joining a second section of the enclosure to the first edge of the wall portion and to the first portion of the PCS optical fiber lead.

In still another particular embodiment, an enclosure includes a first section that includes a base portion and a wall portion. The wall portion is coupled to a perimeter about the base portion. The wall portion includes a first open-ended slot configured to receive a first metallized portion of a first PCS optical fiber lead extending through the wall portion. The enclosure also includes a second section. The second section includes a second edge with a preformed solder layer to fixably engage the first edge of the wall portion and the first metallized portion of the first PCS optical fiber lead at the open-ended slot when heat is applied adjacent to the second edge.

The features, functions, and advantages that are described can be achieved independently in various embodiments or may be combined in yet other embodiments, further details of which are disclosed with reference to the following description and drawings.

DETAILED DESCRIPTION

Apparatuses including hermetically sealed optical components and methods and enclosures for forming hermetically sealed optical components are disclosed. The hermetically sealed optical components may house one or more optoelectronic devices and may be adapted to be coupled to optical fibers as part of an optical fiber network. The hermetically sealed optical components may be formed using low-cost, high volume manufacturing processes. The hermetically sealed optical components may be particularly well suited for coupling to plastic optical fibers with relatively low insertion losses.

In a particular embodiment, an enclosure includes a first section that includes a base portion and wall portions to receive one or more optoelectronic devices. The first section includes one or more open-ended slots in one of the wall portions through which one or more optical fiber leads may be received. An optical fiber lead may be guided into alignment with an optoelectronic device housed in the first section by a high precision alignment body (e.g., a precision molded ceramic block). The optical fiber lead may have a metallized region at a point where the optical fiber lead is received into an open-ended slot in the wall portion of the first section. A portion of the optical fiber lead may be physically coupled to the first section, such as by epoxy or another adhesive, to secure the optical fiber lead to the first section outside the wall portion. The optical fiber lead may include a silica core and a hard polymer cladding. For example, the optical fiber lead may include a portion or length of polymer-clad silica (PCS) fiber. The optical fiber lead may be adapted to couple to a plastic optical fiber with relatively low insertion loses. For example, the optical fiber lead may have an outer diameter and numerical aperture that is substantially equal to a standard poly(methyl methacrylate) (PMMA) plastic optical fiber.

After the optical fiber lead is in place, a second section of the enclosure may be installed over the first section. The second section may be shaped to engage edges of the wall portion of the first section. The second section may include or be coupled to a layer of solder to join the second section to the edges of the wall section and to the metallized portion of the optical fiber lead. Heat may be applied to the second section adjacent to locations where the second section meets the edges of the first section to melt the solder. Thus, the second section may be sealed to the first section and the optical fiber lead to form a hermetically sealed optical component.

Figure 1:
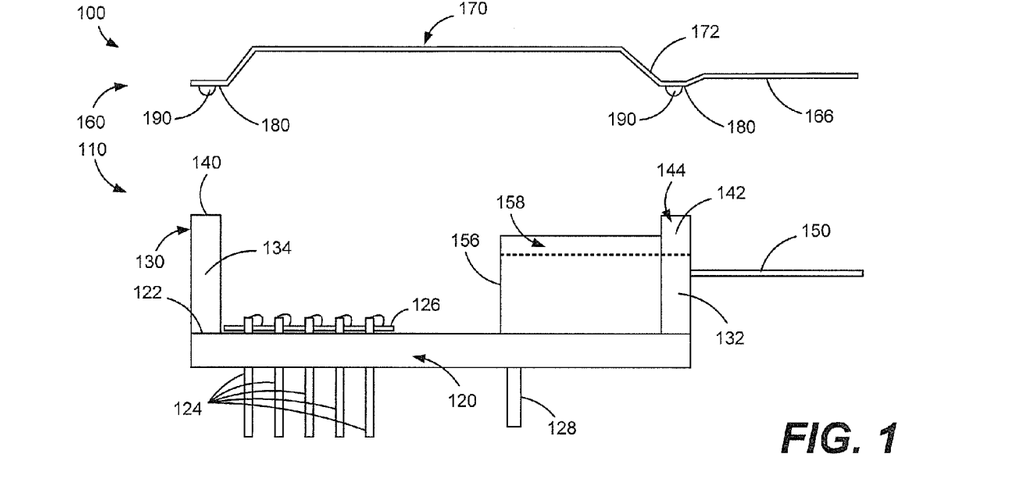
FIG. 1 is a side cross-sectional view of a particular embodiment of an enclosure having a first section and a second section configured to receive one or more optoelectronic devices and to be hermetically sealed to one or more optical fiber leads.

FIG. 1 is a side cross-sectional view of a particular embodiment of an enclosure 100 having a first section 110 and a second section 160 configured to receive one or more optoelectronic devices (not shown in FIG. 1) and to hermetically seal the one or more optoelectronic devices at an end of an optical fiber lead (also not shown in FIG. 1). The first section includes a base portion 120. A plurality of conductive pins 124 extend through the base portion 120 to enable the optoelectronic devices within the first section 110 to be electrically coupled to other devices outside the enclosure 100. The conductive pins 124 are hermetically sealed to the base portion 120. For example, the base portion 120 may be molded around the conductive pins 124 so that the surfaces of the conductive pins 124 are integral with the base portion 120. The enclosure 100 and the conductive pins 124 may be arrange to conform to the Multi-Source Agreement (MSA) Small Form-Factor (SFF) specification. For example, the conductive pins 124 may be arranged in a 2×5 dual-in-line configuration. Further, the enclosure 100 may have physical dimensions that conform to the MSA SFF specification. The enclosure 100 may also include alignments posts 128 as prescribed by the MSA SFF specification.

The base portion 120 may be joined with a first wall portion 130 that extends about a perimeter 122 of the base portion 120. The first wall portion 130 of the enclosure 100 includes a first edge 140 that extends around the periphery of the first wall portion 130. The first edge 140 of the first wall portion 130 is configured to be sealed to a second edge 180 of the second section 160, as further described below.

In the side cross-sectional view of FIG. 1, the first wall portion 130 includes a first wall 132 at one end of the base portion 120 and a second wall 134 at an opposite end of the base portion 120. The first wall 132 includes an open-ended slot 142 formed in the first edge 140. The open-ended slot 142 includes an open end 144 that is configured to receive an end of an optical fiber lead (not shown in FIG. 1). For example, the optical fiber lead may be received into the open-ended slot 142, in the frame of reference of FIG. 1, by lowering the optical fiber lead through the open end 144 of the open-ended slot 142 until the optical fiber lead rests within the open ended slot 142. The first wall 132 may also include or be coupled to a first cable support member 150 that extends outwardly from the first wall 132. As further described with reference to FIG. 4, in a particular embodiment, the optical fiber lead may be physically coupled to the first cable support member 150, such as by an adhesive, to hold the optical fiber lead in place while the enclosure 100 is hermetically sealed.

The first section 110 of the enclosure 100 also may include or be coupled to a high precision alignment body 156. For example, the high precision alignment body 156 may include a precision molded ceramic element that is coupled to one or both of the base portion 120 and the first wall portion 132. The alignment body 156 includes one or more grooves 158 and 159, e.g., one groove for each optical fiber lead that is to be received by the enclosure 100. Each of the grooves 158 or 159 may be configured to align an end of an optical fiber lead with an optoelectronic device (not shown in FIG. 1) within the enclosure 100 such that the optical fiber leads and optoelectronic devices are properly aligned after the enclosure 100 is hermetically sealed. Additionally, precision molding of the alignment body 156 enables the optoelectronic devices and optical fiber leads to be aligned passively (e.g., by the accurate physical placement of the components inside 110) and no active alignment is needed. In this context, active alignment refers to passing light through an optical fiber lead and moving the optical fiber lead to test whether the optical fiber lead is properly aligned with an optoelectronic device.

The second section 160 of the enclosure 100 includes a cap portion 170 surrounded by a second wall portion 172. The cap portion 170 may have a concave inner surface in order to accommodate devices within the enclosure 100 (e.g. one or more optoelectronic devices and interface circuitry 126). The second wall portion 172 extends to the second edge 180, which is configured to sealingly engage the first edge 140 of the first section 110 and the optical fiber leads, as further described with reference to FIG. 5. The second edge 180 may include or be coupled to a preformed solder layer 190 that fully extends around a perimeter of the second edge 180. The preformed solder layer 190 is configured so that, when heat is applied to the second section 160 adjacent to the second edge 180, the preformed solder layer 190 melts to sealingly engage the second edge 180 of the second section 160 with the first edge 140 of the first section 110 and the optical fiber leads, as further described with reference to FIG. 5. A second cable support member 166 may extend from the second edge 180 of the second section 160 opposite the first cable support member 150 of the first section 110 of the enclosure 100 to support one or more optical fiber leads (not shown in FIG. 1).

Figure 2:
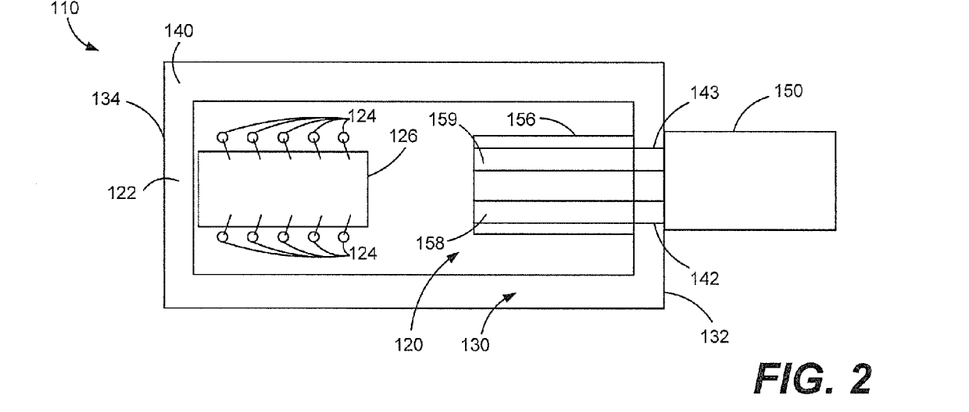
FIG. 2 is top view of the first section of the enclosure of FIG. 1.

FIG. 2 is a top view of the first section 110 of the enclosure 100 of FIG. 1. The base portion 120 supports the conductive pins 124 that permit electrical connection of optoelectronic devices (not shown in FIG. 2) received within the first section 110 with electrical systems or devices outside the enclosure 100. The first section also includes the alignment body 156 which includes one groove for each optical fiber lead. For example, in the embodiment of FIG. 2, the alignment body 156 includes two grooves 158 and 159 to align two optical fiber leads with optoelectronic devices (not shown in FIG. 2) within the first section 110 of the enclosure. The first wall portion 130 of the first section 110 extends around the perimeter 122 of the base portion 120. The first wall portion 130 extends to a first edge 140 that surrounds the first section 110 with the exception of open-ended slots 142 and 143 in the first wall 132 of the first wall portion 130. When the optical fiber leads (not shown in FIG. 2) are in place, the optical fiber leads and the first edge 140 may form a surface that is joined with the second section 160 (FIG. 1) by the preformed solder layer 190. The first cable support member 150 extends outwardly from the first wall 132 of the first wall portion 130 to physically engage and support the optical fiber leads (not shown in FIG. 2).

Figure 3:
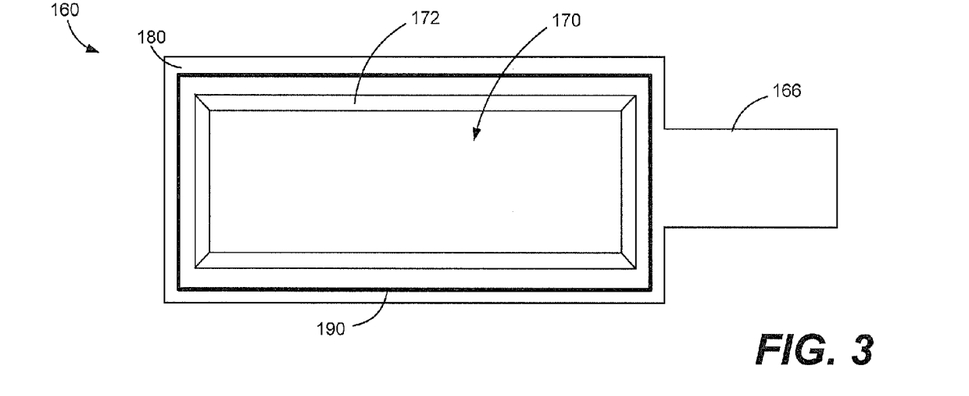
FIG. 3 is a bottom view of the second section of the enclosure of FIG. 1.

FIG. 3 is a bottom view of the second section 160 of the enclosure of FIG. 1. The second section 160 includes the cap portion 170 that is surrounded by the second wall portion 172. The second wall portion 172 extends to the second edge 180 that will be mated to the first edge 140 of the first section 110 of the enclosure (FIGS. 1 and 2). The preformed solder layer 190 extends around a perimeter of the second edge 180 to enable the second section 160 to sealingly engage the first section 110 of the enclosure 100 (FIG. 1). The second cable support member 166 extends outwardly from the second edge 180 to support one or more optical fiber leads (not shown in FIG. 3).

Figure 4:
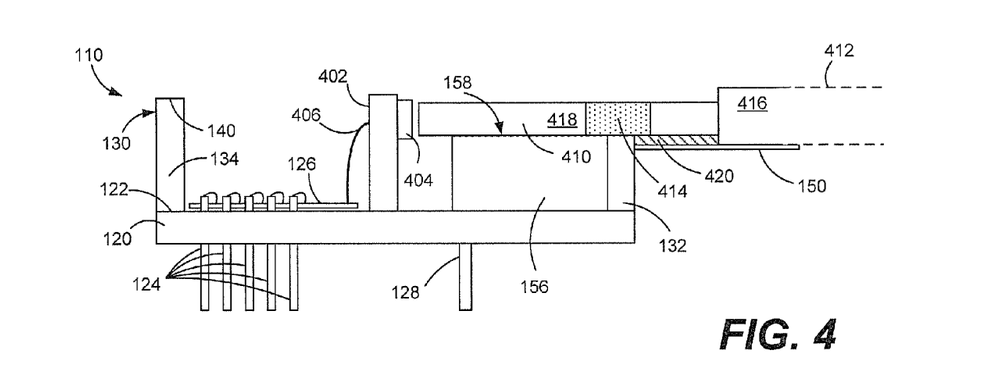
FIG. 4 is a side cross-sectional view of the first section of the enclosure of FIG. 1 in which an optoelectronic device and a PCS optical fiber lead are installed.

FIG. 4 is a side cross-sectional view of the first section 110 of the enclosure 100 of FIG. 1 in which an optoelectronic device 402 and an end 410 of an optical fiber lead 412 are installed. The optoelectronic device 402 may include a detector, a light-emitting diode (LED), a laser diode or another optical device. The optoelectronic device 402 includes an optical surface 404 from which optical signals are transmitted, received, or both, depending on the nature of the optoelectronic device 402. The optoelectronic device 402 is joined by electrical leads 406 and the interface circuitry 126 to two or more of the conductive pins 124 to enable the optoelectronic device 402 to be electrically connected to systems or devices outside of the enclosure 100 of FIG. 1 once the enclosure 100 is sealed. The optoelectronic device 402 also may be mechanically secured to the base portion 120 of the first section 110, such as by an adhesive, solder, metal-to-ceramic brazing, or another physical coupling process or device (not shown in FIG. 4). In a particular embodiment, positioning of the optoelectronic device 402 may be guided by the alignment body 156. For example, the alignment body 156 may include an opening (as shown in illustrative embodiments of FIGS. 8B, 16A and related figures) into which the optoelectronic device 402 is position to facilitate alignment of the optical fiber lead 412 with the optical surface 404 of the optoelectronic device 402.

The end 410 of the optical fiber lead 412 extends through the first wall 132 of the first wall portion 130 of the first section 110 of the enclosure 100 by passing through the open-ended slot 142 (FIGS. 1 and 2) in the first wall 132. The end 410 of the optical fiber lead 412 may be received in the groove 158 in the alignment body 156 to align the end 410 of the optical fiber lead 412 with the optical surface 404 of the optoelectronic device 402 while the enclosure 100 is being assembled and sealed. The optical fiber lead 412 may be physically coupled to the first cable support member 150 using an adhesive 420 or another attachment process or device. The adhesive 420 may hold the optical fiber lead 412 in place while other steps are performed to hermetically seal the enclosure 100. In a particular embodiment, the optical fiber lead 412 is a polymer-clad silica fiber having a silica core 418 and a hard polymer cladding 416. In this embodiment, the adhesive 420 may secure the polymer cladding 416 or a portion of the silica core 418 to the first cable support member 150 and a portion of the silica core 418 may extend through the first wall 132 of the enclosure 100. The optical fiber lead 412 may include a metallized portion 414 located approximately at a point where the silica core 418 extends through the first wall 132 of the wall portion 130. The metallized portion 414 may sealingly engage the open-ended slot (not shown in FIG. 4) and the second edge 180 of the second section 160 of the enclosure 100 when the enclosure 100 is hermetically sealed, as described with reference to FIG. 5.

Figure 5:
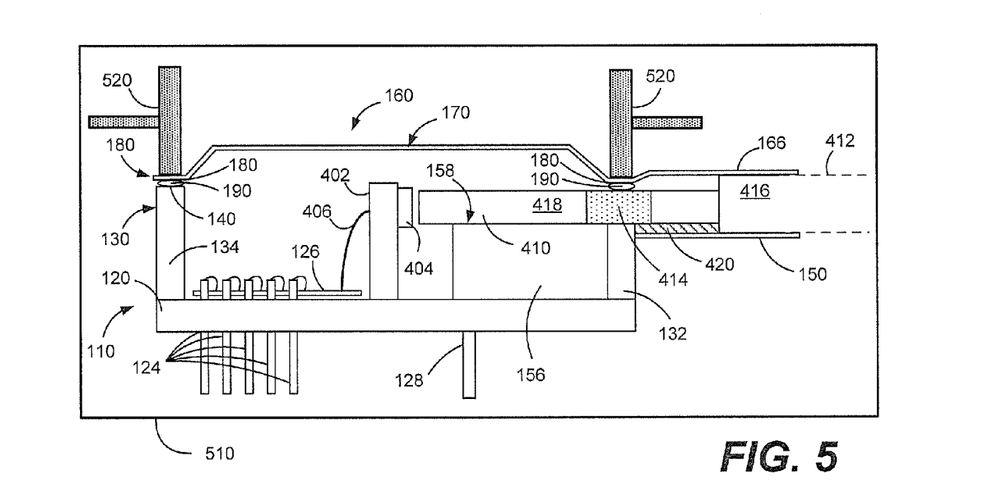
FIG. 5 is a side cross-sectional view of the first section and the second section of the enclosure of FIG. 1 being hermetically sealed in a controlled atmosphere chamber.

FIG. 5 is a side cross-sectional view of the first section 110 and the second section 160 of the enclosure 100 of FIG. 1 being hermetically sealed in a controlled atmosphere chamber 510. In a particular embodiment, the controlled atmosphere chamber 510 may be filled with an inert gas (not shown in FIG. 5) so that the enclosure 100 will be filled with the inert gas after it is hermetically sealed. As a result, the insert gas environment may prevent condensation from forming on the optical surface 404 of the optoelectronic device 402 and/or on the end 410 of the optical fiber lead 412.

To seal the enclosure 100, heated sealing rollers 520 or another heated device may be applied to the second section 160 adjacent to the second edges 180. Application of the heated sealing rollers 520 causes the preformed solder layer 190 on the second edge 180 of the second section 160 of the enclosure 100 to melt. The melted, preformed solder layer 190 joins the second edge 180 of the second section 160 to the first edge 140 of the first section 110 and to the metallized portion 414 of the optical fiber lead 412. Thus, in a single soldering step, the enclosure 100 and the optical fiber lead 412 are hermetically sealed.

Figure 6:
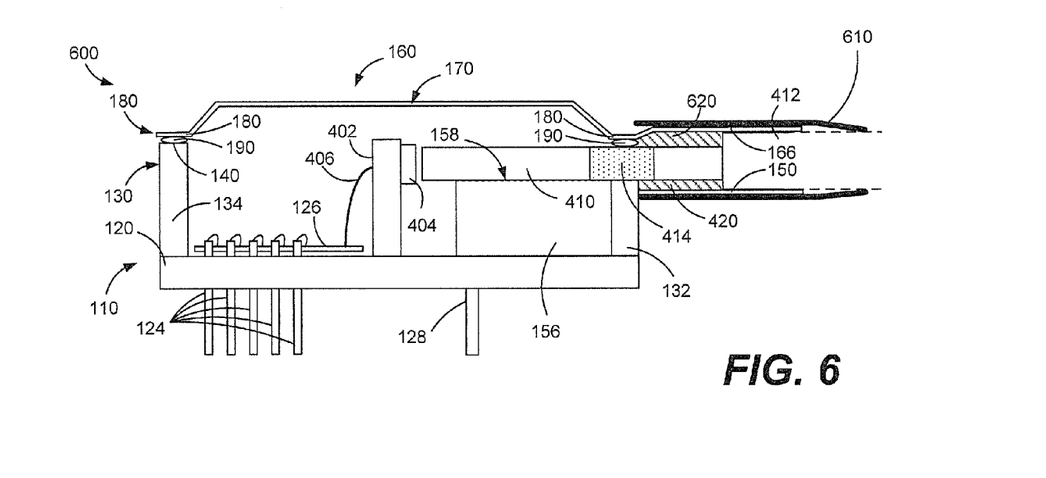
FIG. 6 is a side cross-sectional view of a completed, hermetically sealed enclosure of FIG. 1 fitted with a cable strain relieve boot to form an hermetically sealed optical component.

FIG. 6 is a side cross-sectional view of a completed, hermetically sealed optical component 600 fitted with a cable strain relieve boot 610. The completed, hermetically sealed optical component 600 is sealed when it is removed from the controlled atmosphere chamber 510, with the first section 110, the second section 160, and the optical fiber lead 412 bonded together. To further support the optical fiber lead 412, adhesive 620 may be added between the optical fiber lead 412 and the second cable support member 166. The adhesive 620 may also fill an area between optical fiber leads when hermetically sealed optical component includes more than one optical fiber lead 412.

The cable strain relief boot 610 may be moved into place over the optical fiber lead 412, the first cable support member 150, and the second cable support member 166. The completed, hermetically sealed optical component 600 may be ready for installation and use, e.g., by coupling a second end face of the optical fiber lead 412 to an optical fiber, such as a plastic optical fiber (e.g., a PMMA optical fiber).

Figure 7:
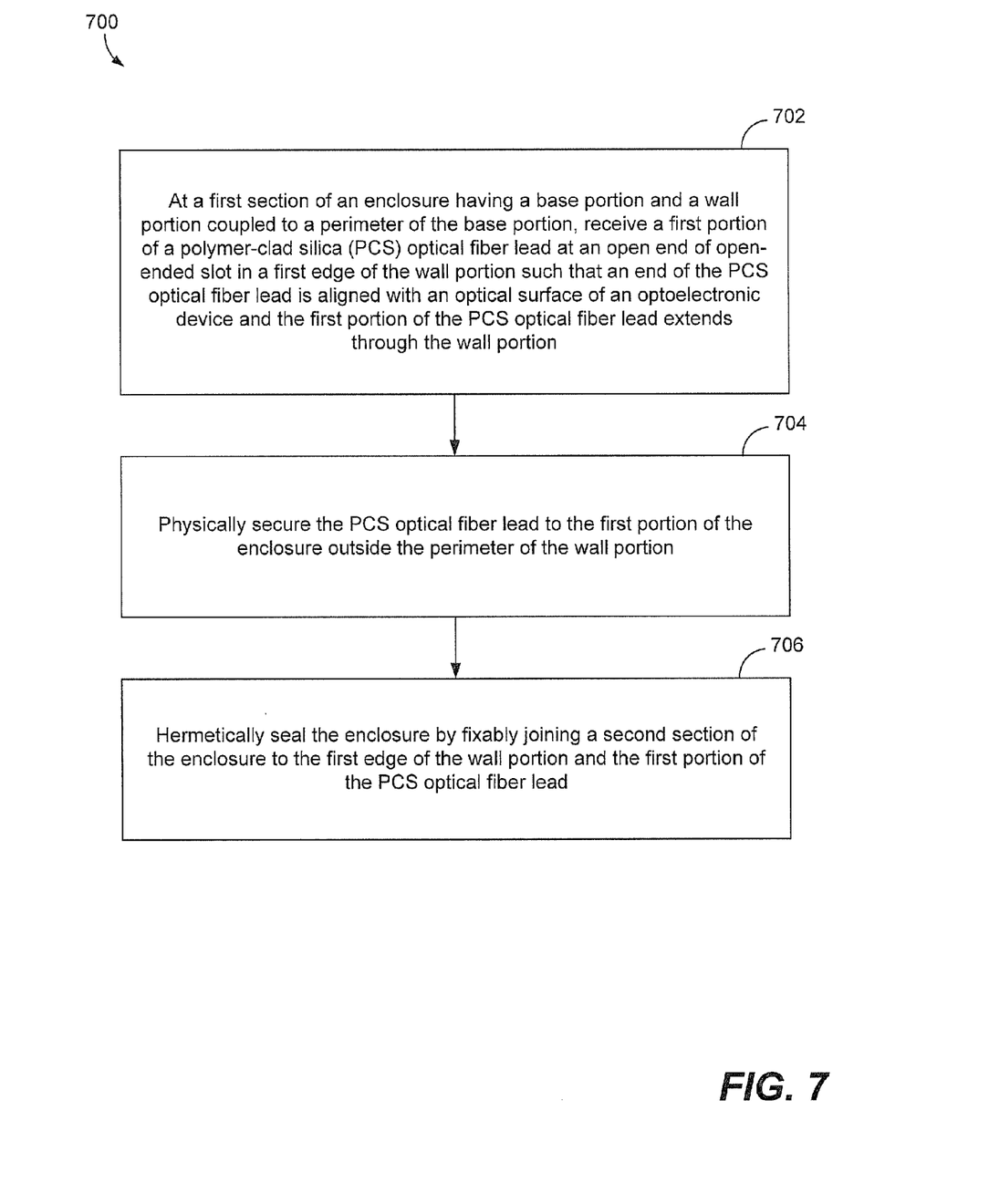
FIG. 7 is a flow diagram of a particular embodiment of a method of forming a hermetically sealed optical component.

FIG. 7 is a flow diagram of a particular embodiment of a method of forming a hermetically sealed optical component. At a first section of an enclosure having a base portion and a wall portion coupled to a perimeter of the base portion, a first portion of an optical fiber lead (e.g., a portion of a polymer-clad silica fiber) is received at an open end of an open-ended slot in a first edge of the wall portion, at 702. The first portion of the optical fiber lead is received and aligned with an optical surface of an optoelectronic device and the first portion of the optical cable extends through the wall portion. For example, with reference to FIG. 4, the enclosure 100 includes the base portion 120 to which the wall portion 130 is coupled around the perimeter 122 of the base portion 120. The end 410 of the optical fiber lead 412 is received at the open end 144 of the open-ended slot 142 in the first edge 140 of the wall portion 130 at the first wall 132. The end 410 of the optical fiber lead 412 is received in the alignment body 156 so that the end 410 is aligned with the optical surface 404 of the optoelectronic device 402 mounted in the first section 110 of the enclosure 100.

The optical fiber lead is physically secured to the first portion of the enclosure outside the perimeter of the wall portion, at 704. For example, the optical fiber lead 412 is secured to the first cable support member 150 of the first section 110 by the adhesive 420 to hold the optical fiber lead 412 in place while the enclosure 100 is hermetically sealed. The enclosure is hermetically sealed by fixably joining a second section of the enclosure to the first edge of the wall portion and to the first portion of the optical fiber lead, at 706. For example, as described with reference to FIG. 5, the heated sealing rollers 520 may be applied adjacent to the second edge 180 of the second section 160 of the enclosure 100, causing the preformed solder layer 190 on the second edge 180 to bond the second section 160 with both the first edge 140 of the first section 110 of the enclosure 100 and to the metallized portion 414 of the optical fiber lead 412.

Figure 14:
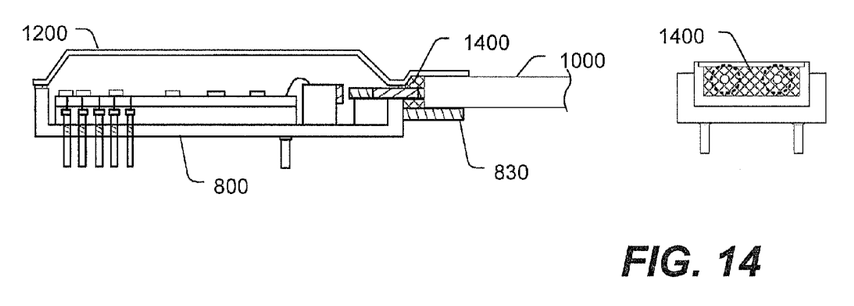
FIG. 14 is a side cross-sectional view of a particular embodiment of the sealed enclosure body and enclosure lid of FIG. 13.
Figure 15:
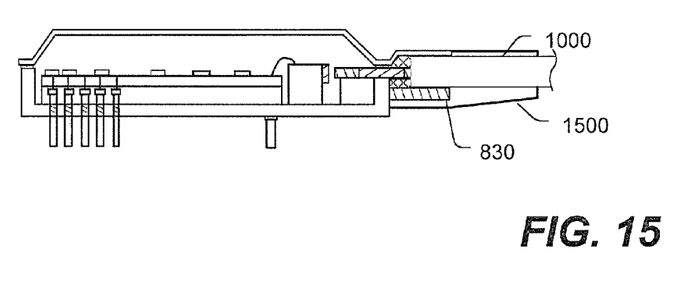
FIG. 15 is a side view of a particular embodiment of the sealed enclosure body and enclosure lid of FIG. 14 with a fiber boot forming a hermetically sealed optical component.
Figure 16A:
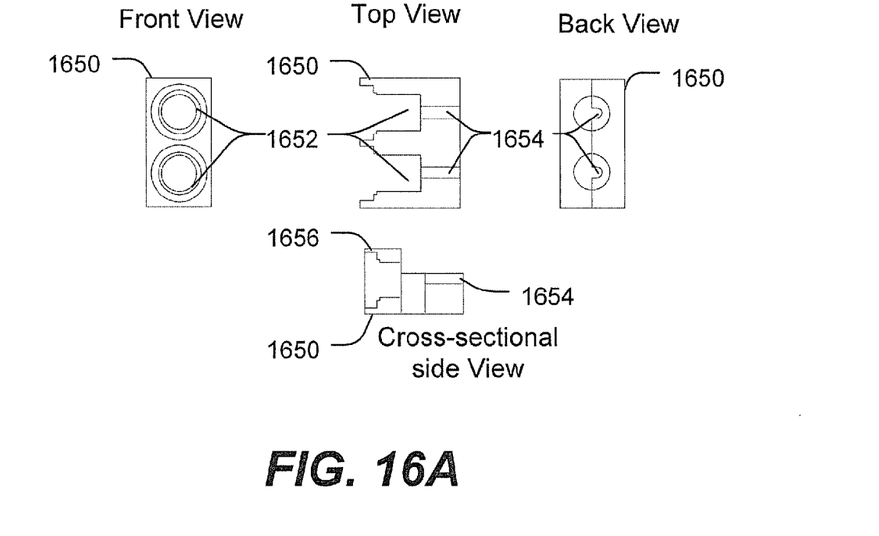
FIG. 16A is several views of a particular embodiment of a fiber alignment block for optoelectronic device in TO type packages.
Figure 16B:
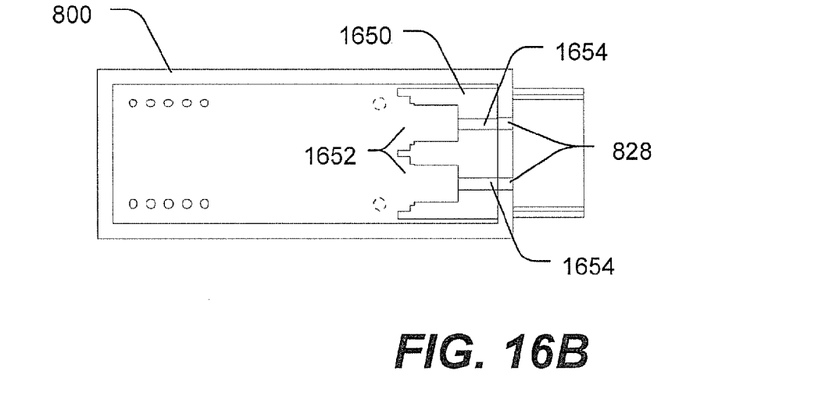
FIG. 16B is a top view of a particular embodiment of the fiber alignment block of FIG. 16A within the enclosure body of FIG. 8A.
Figure 17A:
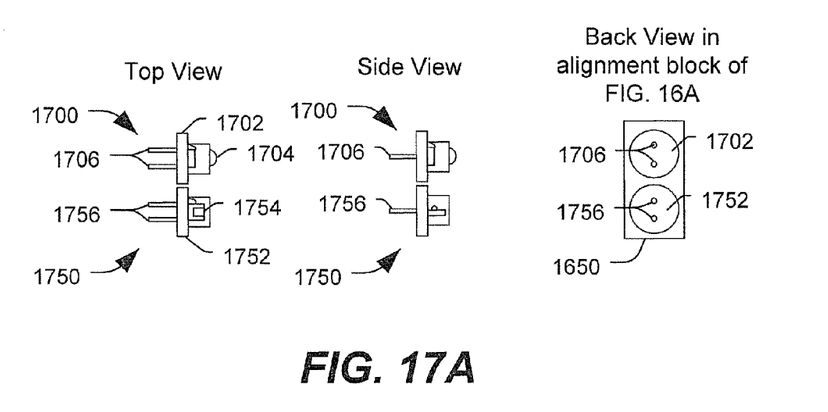
FIG. 17A is several views of particular embodiments of optoelectronic devices in TO type package.
Figure 17B:
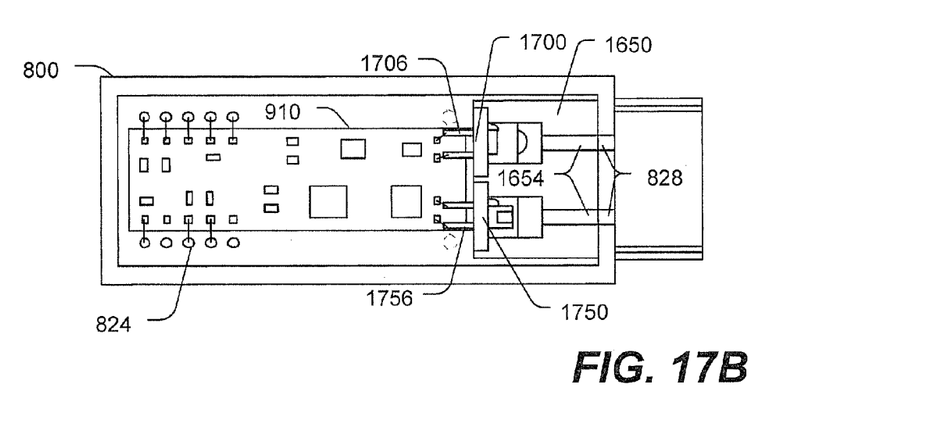
FIG. 17B is a top view of a particular embodiment of the optoelectronic devices of FIG. 17A and interface circuitry within the enclosure body of FIG. 16B.
Figure 18:
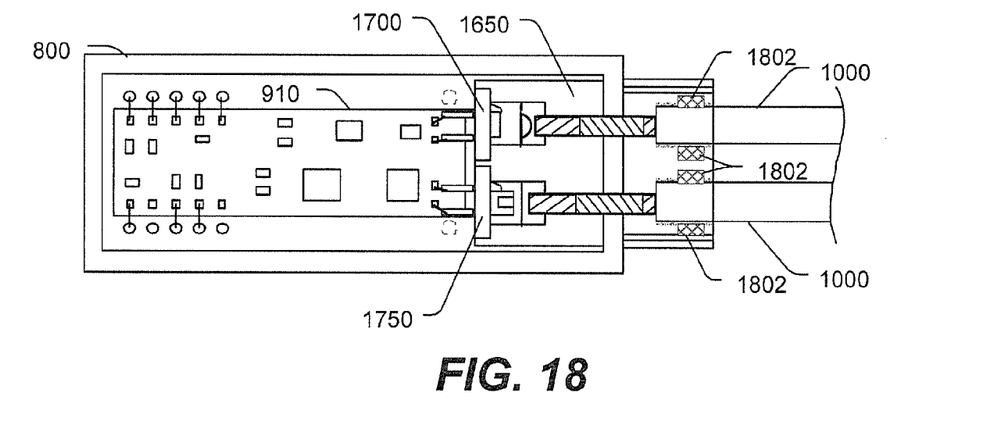
FIG. 18 is a top view of a particular embodiment of the PCS optical fiber leads of FIG. 10 inserted into the enclosure body of FIG. 17B.

FIGS. 8-15 illustrate formation of a hermetically sealed optical component including first types of optoelectronic device (i.e., a laser diode on a Kovar submount and a detector on a ceramic submount) and FIGS. 16-18 illustrate formation of a hermetically sealed optical component including second types of optoelectronic device (i.e., a laser and a detector in TO18 type headers). The first and second types of optoelectronic devices are examples of commercially available optoelectronic devices that have different form factors. Embodiments disclosed herein enable assembly of hermetically sealed optical components using various form factors of optoelectronic devices, including the first type of optoelectronic device, the second type of optoelectronic device, and potentially other types optoelectronic devices. Each hermetically sealed optical component may have an align block that is designed for use with a particular form factor of optoelectronic device. Other constituent parts of the hermetically sealed optical components may be unchanged regardless of the form factor of the optoelectronic device or devices used.

Figure 8A:
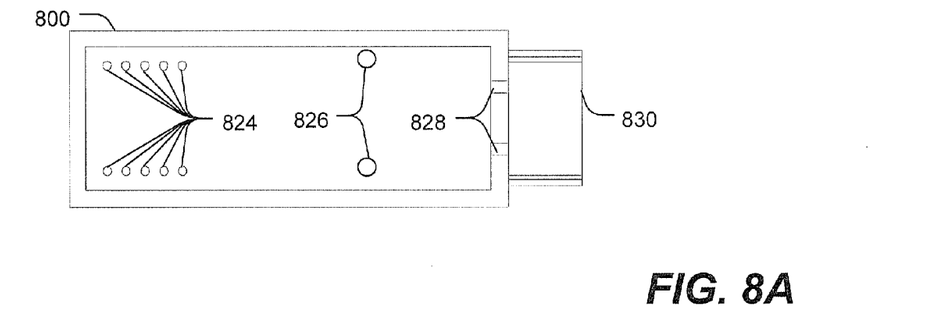
FIG. 8A is a top view of a particular embodiment of an enclosure body.

FIG. 8A is top views of a particular embodiment of an enclosure body 800. For example, the enclosure body 800 may correspond to the first section 110 of the enclosure 100 of FIGS. 1-6. The enclosure body 800 may have two rows of 2×5 dual-in-line pins 824 for wire bonding to electronic components inside the enclosure body 800 (e.g., one or more optoelectronic devices and interface circuitry, as further described below). The pins 824 may be arranged in compliance with the industrial Multi-Source Agreement (MSA) standard. The enclosure body 800 may also include two mechanical package alignment posts 826 that are arranged in compliance with the industrial MSA standard.

Figure 8B:
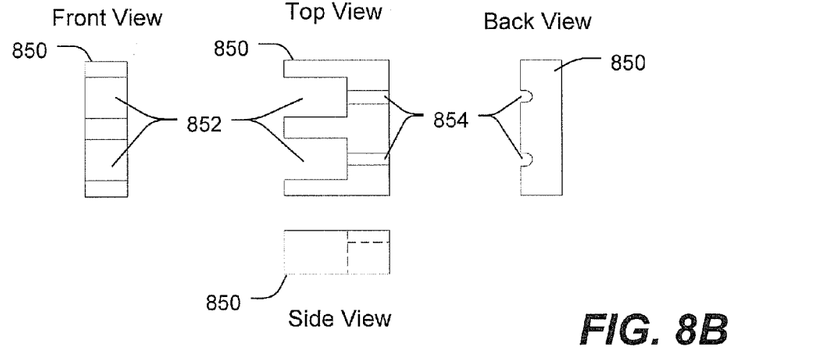
FIG. 8B is several views of a particular embodiment of a fiber alignment block.

FIG. 8B is several views of a particular embodiment of a fiber alignment block 850. For example, the fiber alignment block 850 may correspond to a particular embodiment of the alignment body of FIGS. 1-6. The fiber alignment block 850 is shown from multiple views, including a top view, a side view, a back view (i.e., a view from the right side of the top view in the orientation illustrated of FIG. 8B) and a front view (i.e., a view from the left side of the top view in the orientation illustrated in FIG. 8B). In a particular embodiment, the fiber alignment block 850 is formed using a high precision ceramic molding process.

In the embodiment illustrated in FIG. 8A, the enclosure body 800 includes two U-grooves 828 near a fiber snout 830. The U-grooves 828 may correspond to the open-ended slots 142 and 143 of FIGS. 1-6 and the fiber snout 830 may correspond to the first cable support member 150 of FIGS. 1-6. The two U-grooves 828 are arranged to receive and facilitate alignment of two optical fiber leads (not shown in FIG. 8A). Thus, for example, the U-grooves 828 may have a width that corresponds to a diameter of a portion of the optical fiber leads that is to extend into the enclosure body 800. To illustrate, the dimensions and locations of the U-grooves 828 may be configured to accommodate two polymer-clad silica fibers, each with a 1 mm core diameter and a 3 mm diameter with an outer jacket. When a different number of optical fiber leads are to extend into the enclosure body 800 (e.g. more than two or fewer than two), the enclosure body 800 may include one U-groove for each optical fiber lead.

The fiber alignment block 850 may be configured to accommodate one or more optoelectronic devices, such as a detector and a laser (or another light source) mounted on precision submounts. For example, the fiber alignment block 850 may include an opening 852 to receive and align each of the optoelectronic devices. The fiber alignment block 850 may also include a U-groove 854 with substantially the same width and depth as the U-grooves 828 of the enclosure body 800. For example, the U-grooves 854 may be sized to receive polymer-clad silica fiber with a 1 mm core diameter. The openings 852 and the U-grooves 854 of the fiber alignment block 850 may be arranged such that when an optoelectronic device is positioned in one of the openings 852 and an optical fiber lead is positioned in the U-grooves 854 and 828, an end-face of the optical fiber lead is aligned with an optical surface of the optoelectronic device.

Figure 8C:
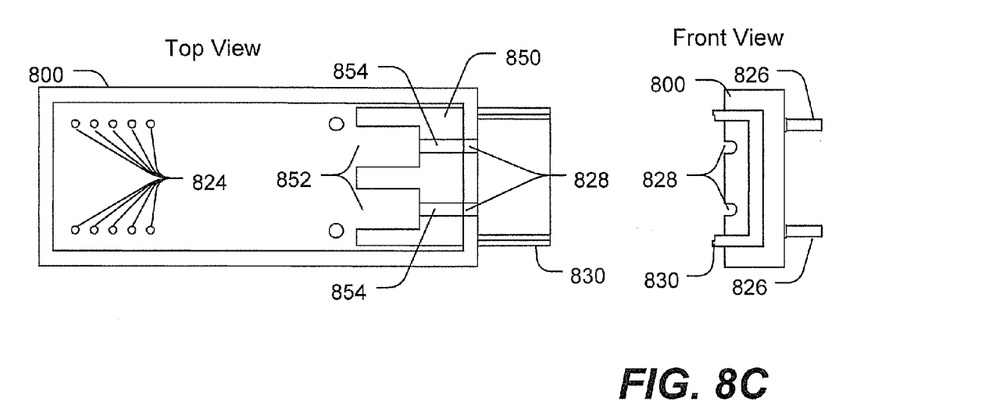
FIG. 8C is several views of a particular embodiment of the fiber alignment block of FIG. 8B within the enclosure body of FIG. 8A.

FIG. 8C is several views of a particular embodiment of the fiber alignment block 850 of FIG. 8B within the enclosure body 800 of FIG. 8A. Specifically, FIG. 8C shows a top view and a front view (from an end nearest the fiber snout 830) of the enclosure body 800 and fiber alignment block 850. In a particular embodiment, the fiber alignment block 850 may be attached permanently to the enclosure body 800 (e.g., using high temperature blazing or another ceramic to metal bonding process). The U-grooves 828 of the enclosure body 800 wall and the U-grooves 854 of the fiber alignment block 850 may be precisely aligned for placement of optical fiber leads in a later processing step.

Figure 9A:
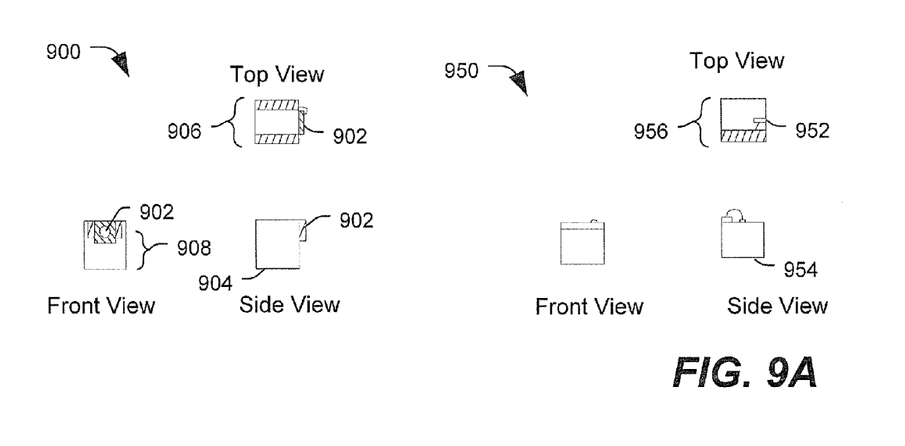
FIG. 9A is several views of particular embodiments of optoelectronic devices on submounts.

FIG. 9A is several views of particular embodiments of optoelectronic devices 900 and 950. The optoelectronic devices 900 and 950 may be of the same type or may be different. For example, when the hermetically sealed optical component to be formed is an optical transceiver, a first optoelectronic device 900 may include an optical detector to receive signals and a second optoelectronic device 950 may include a light source to generate and send light signals. Each of the optoelectronic devices 900 and 950 may include an optical surface, such as a first optical surface 902 of the first optoelectronic device 900 and a second optical surface 952 of the second optoelectronic device 950. For example, the first optical surface 902 may be arranged to detect light output from the optical fiber lead and the second optical surface 952 may be a light emitting surface of a laser or other light source to be coupled to the optical fiber lead.

The optoelectronic devices 900 and 950 may each include a mounting surface, such as first mounting surface 904 of the first optoelectronic device 900 and a second mounting surface 954 of the second optoelectronic device 900. The optoelectronic devices 900 and 950 may be commercial off-the-shelf components. Accordingly, the mounting surfaces 904, 954 may have various configurations depending on which component is used. To illustrate, the mounting surfaces 904, 954 may formed of ceramic, a metal (e.g., Kovar), another material, or a combination thereof. In some embodiments, one or more of the mounting surfaces 904, 954 may include a submount. The submount of a particular optoelectronic device may be configured to adjust a height 908 of the optical surface of the particular optoelectronic device to align with the optical center of an optical fiber lead within a U-groove 854 of the fiber alignment block 850. In a particular embodiment, a submount for a detector (e.g., the first optoelectronic device 900) is made of alumina ceramic material, and the submount for a transmitter (e.g., the second optoelectronic device 950) is made of Kovar or another metal or alloy to improve heat sink characteristics of the submount and to lower thermal resistance of the submount.

Figure 9B:
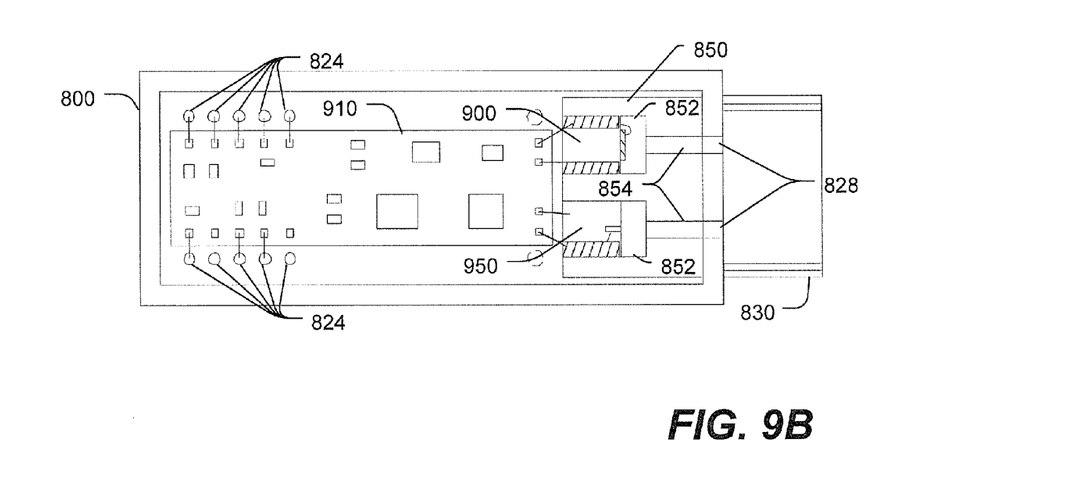
FIG. 9B is a top view of a particular embodiment of the optoelectronic devices of FIG. 9A and interface circuitry within the enclosure body of FIG. 8C.

FIG. 9B is a top view of a particular embodiment of the optoelectronic devices of FIG. 9A and interface circuitry 910 within the enclosure body 800 of FIG. 8C. In FIG. 9B, the mounting surfaces 904, 954 of the optoelectronic devices 900, 950 have been mounted to an interior surface of the enclosure body 800. The optoelectronic devices 900, 950 are mounted within the openings 852 of the fiber alignment block 850. Each of the openings 852 has a width that corresponds to a width 906, 956 of the optoelectronic device 900, 950 to be mounted within the opening 852. Thus, the openings 852 guide installation of the optoelectronic devices 900, 950 in a manner that aligns each optical surface 902, 952 with a corresponding U-groove 854 of the fiber alignment block 850. Thus, the optoelectronic devices 900, 950 can be mounted on respective submounts in a manner that easily and precisely aligns them with the U-grooves 854 of the fiber alignment block 850 and the U-grooves 828 of the enclosure body 800. After the optoelectronic devices 900, 950 are mounted to the enclosure body 800, the optoelectronic devices 900, 950 are attached (e.g., wire bonded) to interface circuit 910. The pins 824 connect the interface circuitry 910 to an external system (not shown) which inputs an electrical signal to drive the light source 950 and/or receives an electrical signal converted from the detector 900.

Figure 10:
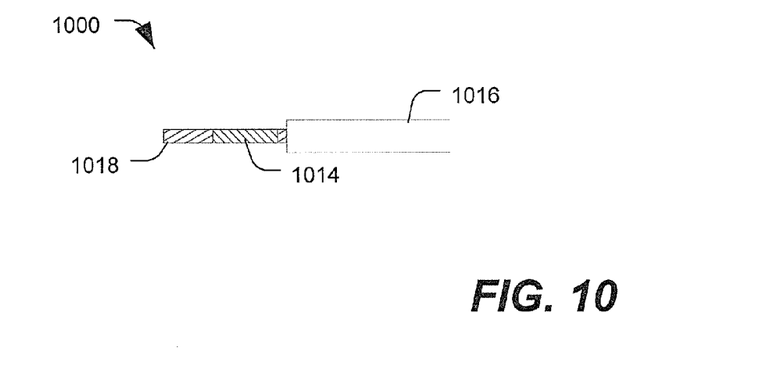
FIG. 10 is a top view of a particular embodiment of an optical fiber lead.

FIG. 10 is a top view of a particular embodiment of an optical fiber lead 1000. In a particular embodiment, the optical fiber lead 1000 may correspond to the optical fiber lead 412 of FIGS. 4-6. The optical fiber lead 1000 may be a portion of a polymer-clad silica (PCS) optical fiber with a silica core 1018 and a polymer cladding with an outer jacket 1016. A portion of the silica core 1018 may be exposed. The optical fiber lead 1000 may also include a metallized portion 1014 over the exposed portion of the silica core 1018.

Figure 11:
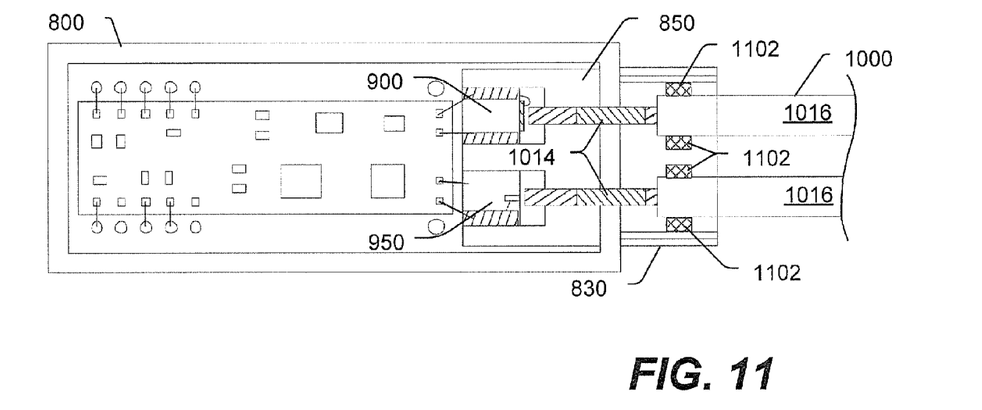
FIG. 11 is a top view of a particular embodiment of PCS optical fiber leads of FIG. 10 inserted into the enclosure body of FIG. 9B.

FIG. 11 is a top view of a particular embodiment of a pair of optical fiber leads 1000 of FIG. 10 inserted into the enclosure body 800 of FIG. 9B. Each of the optical fiber leads 1000 is placed into a corresponding U-groove of the fiber alignment block 850 and a correspond U-groove of the enclosure body 800. The metallized portion 1014 of each of the optical fiber leads 1000 may be fully embedded in the corresponding U-grooves of the fiber alignment block 850 and the enclosure body 800. The polymer cladding with the outer jacket 1016 of each of the optical fiber leads 1000 may be coupled to the fiber snout 830 of the enclosure body 800 using a quick cure adhesive 1102. The adhesive 1102 holds the optical fiber leads 1000 in place (e.g., inside the U-grooves) during subsequent manufacturing process steps.

The optical fiber leads 1000 are automatically aligned to optical surfaces of the optoelectronic devices 900, 950 without using the active fiber alignment processes. For example, the optical fiber leads 1000 may have a core diameter of about 1 mm (i.e., the diameter of the silica core 1018). The polymer cladding with the outer jacket 1016 may have an outer diameter of about 3 mm. The location and length of the metallized portion 1014 may be designed to match the U-groove of the enclosure body 800 and the U-groove of the fiber alignment block 850. The metallized portion 1014 may include gold (Au) and nickel (Ni) layers with thicknesses of about 0.2 micron and 4 micron, respectively. The Au/Ni layers facilitate sealing of the optical fiber leads 1000 to the enclosure body 800 in subsequent package hermetic sealing steps.

Figure 12:
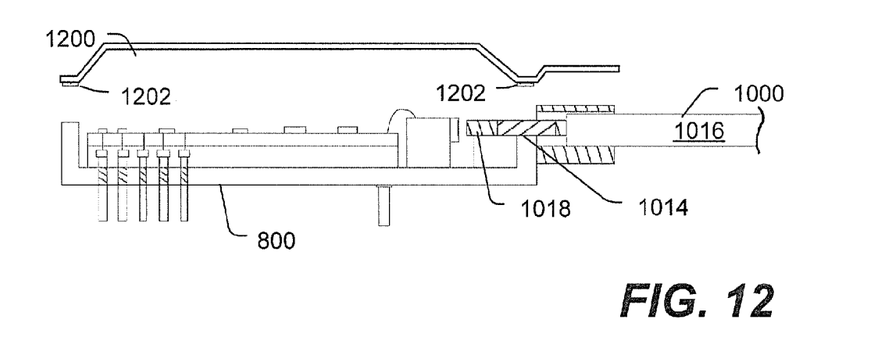
FIG. 12 is a side cross-sectional view of a particular embodiment of the enclosure body of FIG. 11 and an enclosure top.

FIG. 12 is a cross-sectional side view of a particular embodiment of the enclosure body 800 of FIG. 11 and an enclosure top 1200. After the optical fiber leads 1000 are attached to the enclosure body 800 (as described with reference to FIG. 11), the enclosure top 1200 may be sealed to the enclosure body 800. A bottom portion of the enclosure top 1200 may include or be coupled to a layer of solder 1202 for package sealing. The solder 1202 may be coated on the bottom portion of enclosure top 1200 as a solder perform. The solder 1202 may be Au/Sn solder to make a high reliability solder joint. The melting temperature of the Au/Sn solder may be about 280 degree C., which is higher than most of the commonly used solder alloys. Thus, a high temperature lid seal process may be used to form reliable hermetic package with the Au/Sn solder. The metallized portion 1014 of the optical fiber lead 1000 may be subject to significant heating during the high temperature lid seal process. Accordingly, the metallized portion 1014 is applied over the silica core 1018, which can withstand the heating more readily than the polymer cladding with the outer jacket 1016 can.

Figure 13:
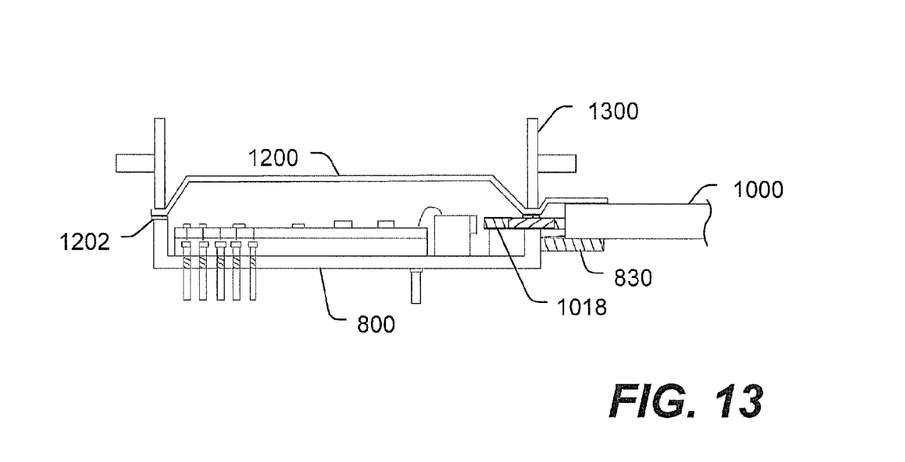
FIG. 13 is a cross-sectional side view of a particular embodiment of the enclosure top of FIG. 12 being sealed to the enclosure body of FIG. 12 by sealing rollers.

FIG. 13 is a cross-sectional side view of a particular embodiment of the enclosure top 1200 of FIG. 12 being sealed to the enclosure body 800 of FIG. 12 by sealing rollers 1300. After the enclosure top 1200 is placed on top of the enclosure body 800, a seam sealer may be used to melt the solder 1202. For example, a pair of parallel seam sealing rollers 1300 may be moved along the edges of the enclosure top 1200. The sealing rollers 1300 may be heated to about 300 degree C. as they move along the edges of the enclosure top 1200. As the sealing rollers 1300 move along an edge of the enclosure top 1200 adjacent to the fiber snout 830, the solder 1202 may reflow over the U-grooves and the metallized portion 1014 of the optical fiber leads. The solder 1202 may fill the U-grooves with melted solder. After the sealing rollers 1300 complete their movement along the edges of the enclosure top 1200, heating stops and the solder 1202 solidifies forming a hermetic seal between the enclosure top 1200, the enclosure body 800 and the optical fiber leads. The seam sealing process may be performed in a controlled environment, such as inside a dry enclosure filled with an inert gas (e.g., nitrogen). Thus, an interior of the hermetically sealed enclosure body may be filled with the inert gas.

FIG. 14 is several views of a particular embodiment of the sealed enclosure body 800 and enclosure top 1200 of FIG. 13. After the enclosure body 800 and enclosure top 1200 are hermetically sealed, additional adhesive (e.g., epoxy) may be back filled inside the fiber snout 830 for fiber strain relieve.

FIG. 15 is side cross-sectional view of a particular embodiment of the sealed enclosure body 800 and enclosure top 1200 of FIG. 14 with a fiber boot 1500 forming a complete, hermetically sealed optical component. After the adhesive 1400 is added, the fiber boot 1500 may be installed on the fiber snout 830. The fiber boot 1500 may support an outer jacket of the optical fiber lead 1000. The fiber boot 1500 may also protects the optical fiber lead 1000 from bending more than its allowable bend radius.

Many low cost optoelectronic devices, such as detector, laser, light emitting diodes (LEDs) and Vertical Cavity Surface Emitting lasers (VCSELs) are supplied in TO18 packaging or other similar packaging. In a particular embodiment, one or more optoelectronic devices used to form a hermetically sealed optical component, as disclosed herein, may be in a TO18 package. In this embodiment, a fiber alignment block may be adapted to receive the TO18 package and to facilitate alignment of the optoelectronic devices with optical fiber leads. Additionally, an enclosure top may be taller to accommodate the TO18 package. FIGS. 16-18 illustrate embodiments of forming a hermetically sealed optical component using optoelectronic devices in TO18 packages (also call TO headers). In the embodiments illustrated in FIGS. 16-18, certain components are similar to components described above with reference to FIGS. 8-15. Accordingly, detailed description of those components is omitted. Reference numerals that are used in FIGS. 8-15 are also used in FIGS. 16-18 to denote elements that are the same or similar with minor variations.

FIG. 16A is several views of a particular embodiment of a fiber alignment block 1650. For example, fiber alignment block 1650 may correspond to the alignment body 156 of FIGS. 1-6. The fiber alignment block 1650 is shown from multiple views, including a top view, a cross-sectional side view, a back view (i.e., a view from the right side of the top view in the orientation illustrated of FIG. 16A) and a front view (i.e., a view from the left side of the top view in the orientation illustrated in FIG. 16A). In a particular embodiment, the fiber alignment block 1650 is formed using a high precision ceramic molding process. The fiber alignment block 1650 may be adapted to receive optoelectronic devices, e.g., a detector and a laser, in TO18 packages, at openings 1652. A location and a size of fiber alignment U-grooves 1654 may be substantially the same as the U-grooves 854 of the fiber alignment block 850 of FIG. 8B; however, a front side 1656 of the fiber alignment block 1650 may be taller to accommodate the TO18 packages and to align the optoelectronic devices with centers of the U-grooves 1654.

FIG. 16B is a top views of a particular embodiment of the fiber alignment block 1650 of FIG. 16A within the enclosure body 800 of FIG. 8A. In a particular embodiment, the fiber alignment block 1650 may be attached permanently to the enclosure body 800 (e.g., using high temperature blazing or another ceramic to metal bonding process). The U-grooves 828 of the enclosure body 800 wall and the U-grooves 1654 of the fiber alignment block 1650 may be precisely aligned for placement of optical fiber leads in a later processing step.

FIG. 17A is several views of particular embodiments of optoelectronic devices 1700 and 1750 in TO18 packaging. The optoelectronic devices 1700 and 1750 may be of the same type or may be of different types. For example, when the hermetically sealed optical component to be formed is an optical transceiver, a first optoelectronic device 1700 may include an optical detector to receive signals and a second optoelectronic device 1750 may include a light source to generate and send light signals. Each of the optoelectronic devices 1700 and 1750 may include an optical surface, such as a first optical surface 1704 of the first optoelectronic device 1700 and a second optical surface 1754 of the second optoelectronic device 1750. To illustrate, the first optical surface 1704 may be arranged to detect light of a light based signal and the second optical surface 1754 may be a light emitting surface of a laser or other light source. Each of the optoelectronic devices 1700 and 1750 may include a TO18 header 1702, 1752 and leads 1706, 1756, respectively. The TO18 headers 1702, 1752 may be received into the fiber alignment block 1650 in alignment with the U-grooves 1654 of the fiber alignment block 1650. Referring to FIG. 17B, the leads 1706, 1756 may be electrically coupled to the pins 824 via the interface circuitry 910 (e.g., via wire bonding).

FIG. 18 is a top view of a particular embodiment of the optical fiber leads 1000 of FIG. 10 inserted into the enclosure body of FIG. 17B. With the fiber alignment block 1650 aligning the optoelectronic components 1700, 1750 with the U-grooves of the fiber alignment block 1650 and the enclosure body 800, the optical fiber leads 1000 are automatically aligned with the optoelectronic components 1700, 1750. The optical fiber leads 1000 may be coupled to the enclosure body 800 using an adhesive 1802, which holds the optical fiber leads 1000 in place (e.g., inside the U-grooves) during subsequent manufacturing process steps. The subsequent manufacturing process steps may be performed in the same manner as described with reference to FIGS. 12-15. For example, an enclosure top (sized to accommodate the fiber alignment block 1650) may be placed over the enclosure body 800 and seam sealed to hermetically seal the enclosure body 800, the enclosure top, and the optical fiber leads 1000. Adhesive may be backfilled into the fiber snout of the enclosure body, and a fiber boot may be positioned over the optical fiber leads and the fiber snout.

Thus, low cost, hermetically sealed optical components can be manufactured using processes disclosed herein. The hermetically sealed optical components may be well suited to coupling to PMMA plastic optical fibers since the core and cladding diameters of the optical fiber leads used provide relatively low coupling losses when the hermetically sealed optical components are coupled to PMMA plastic optical fibers. The hermetically sealed optical components may include transmitters, receivers, transceivers or other optical or optoelectronic devices.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. An apparatus comprising:
    an enclosure configured to contain at least one optoelectronic device and to interface the at least one optoelectronic device to a polymer-clad silica (PCS) optical fiber lead;
    wherein the enclosure includes:
        a first section including:
            a base portion; and
            a wall portion coupled to a perimeter of the base portion, wherein the wall portion defines an open-ended slot in a first edge, wherein the open-ended slot includes an open end that is configured to receive a first portion of the PCS optical fiber lead, wherein the first portion of the PCS optical fiber lead extends through the wall portion towards an interior of the enclosure and includes a silica core with a metalized outer region over a portion of the silica core and a first end face adapted to be aligned with an optical surface of the at least one optoelectronic device, and
            wherein a second portion of the PCS optical fiber lead extends towards an exterior of the enclosure and includes a second end face adapted to be coupled to a plastic optical fiber; and
        a second section configured to sealingly engage the first edge of the wall portion and the metalized outer region of the PCS optical fiber lead at the open end of the open-ended slot.

2. The apparatus of claim 1, wherein the second section includes a cap portion surrounded by a second wall portion extending to a second edge, wherein the second edge is configured to sealingly engage the first edge of the wall portion and the metalized outer region of the PCS optical fiber lead.

3. The apparatus of claim 2, wherein the cap portion includes a concave surface, wherein the concave surface is configured to accommodate the at least one optoelectronic device.

4. The apparatus of claim 2, further comprising a preformed solder layer of the second edge, wherein heat applied proximate to the second edge causes the preformed solder layer to sealingly engage the second edge to the first edge of the first section and to the metalized outer region of the PCS optical fiber lead.

5. The apparatus of claim 1, wherein the first section includes a first cable support member extending from the wall portion adjacent to the open-ended slot, wherein the first cable support member is configured to engage the PCS optical fiber lead outside the wall portion.

6. The apparatus of claim 5, wherein the second section includes a second cable support member, wherein the second cable support member is configured to engage the PCS optical fiber lead.

7. The apparatus of claim 6, further comprising an adhesive coupling the PCS optical fiber lead to the first cable support member and to the second cable support member.

8. The apparatus of claim 1, further comprising an alignment body coupled to the base portion and configured to guide alignment of the PCS optical fiber lead to the optical surface of the at least one optoelectronic device.

9. The apparatus of claim 1, further comprising a plurality of conductive pins extending through the base portion towards an exterior of the enclosure to enable the at least one optoelectronic device to be electrically coupled to at least one other device outside of the enclosure, wherein the base portion is sealingly engaged with the plurality of conductive pins.

10. A method comprising:
physically securing a polymer-clad silica (PCS) optical fiber lead to a first section of an enclosure,
wherein a first portion of the PCS optical fiber lead extends through a wall portion of the first section towards an interior of the enclosure and includes a silica core with a metalized outer region over a portion of the silica core and a first end face adapted to be aligned with an optical surface of an optoelectronic device, and
wherein a second portion of the PCS optical fiber lead extends towards an exterior of the enclosure and includes a second end face adapted to be coupled to a plastic optical fiber; and
hermetically sealing the enclosure by fixably joining a second section of the enclosure to the first section and to the metalized outer region of the PCS optical fiber lead.

11. The method of claim 10, wherein fixably joining the second section of the enclosure to the first section and to the metalized outer region of the PCS optical fiber lead includes soldering the second section to the wall portion of the first section and to the metalized outer region of the first portion of the PCS optical fiber lead.

12. The method of claim 11, further comprising positioning a preformed solder layer along the second section and applying heat adjacent to the second section using heated rollers.

13. The method of claim 11, wherein an outer jacket of the PCS optical fiber lead is physically secured to the enclosure outside the wall portion.

14. The method of claim 13, wherein the outer jacket is physically secured to the enclosure outside the wall portion by adhering the PCS optical fiber lead to a first cable support member that extends from the first section of the enclosure.

15. The method of claim 14, further comprising physically securing the PCS optical fiber lead to a second cable support member extending from the second section of the enclosure.

16. An enclosure comprising:
a first section including:
a base portion; and
a wall portion coupled to the base portion, wherein the wall portion includes a first open-ended slot configured to receive a first portion of a polymer-clad silica (PCS) optical fiber lead,
wherein the first portion of the PCS optical fiber lead extends through the wall portion towards an interior of the enclosure and includes a silica core with a metalized outer region over a portion of the silica core and a first end face adapted to be aligned with an optical surface of an optoelectronic device, and
wherein a second portion of the PCS optical fiber lead extends towards an exterior of the enclosure and includes a second end face adapted to be coupled to a plastic optical fiber; and
a second section including a second edge configured to support a preformed solder layer to sealingly engage the second edge of the second section with a first edge of the wall portion and the metalized outer region of the PCS optical fiber lead when heat is applied adjacent to the second edge.

17. The enclosure of claim 16, further comprising an alignment block attached to at least one of the base portion or the wall portion using a metal-to-ceramic brazing.

18. The enclosure of claim 17, wherein the alignment block is configured to receive the optoelectronic device and at least a part of the first portion of the PCS optical fiber lead such that the optical surface of the optoelectronic device and the first end face for the PCS optical fiber lead are aligned.

19. The enclosure of claim 16, wherein the optoelectronic device has a TO18 type packaging.

20. The enclosure of claim 16, wherein the optoelectronic device has a ceramic or metal submount type packaging.

21. The enclosure of claim 17, wherein the alignment block is formed using a ceramic molding process.

22. The apparatus of claim 1, wherein the plastic optical fiber is a polymethyl methacryl ate (PMMA) plastic optical fiber.

23. The apparatus of claim 1, wherein the enclosure is configured to fully enclose the at least one optoelectronic device, wherein the first edge extends a length of the perimeter, wherein the second section includes a plurality of second edges that form a second perimeter around the second section, each of the plurality of second edges coupled to a preformed solder layer that sealingly engages the plurality of second edges with the first edge to fully enclose the at least one optoelectronic device, and wherein the preformed solder layer sealingly engages at least one of the plurality of second edges with the metalized outer region of the optical fiber lead.

24. The apparatus of claim 1, wherein at least one of a core diameter or a cladding diameter of the optical fiber lead provides relatively low insertion losses when the optical fiber lead is coupled to the plastic optical fiber.

* * * * *